United States Patent
Pan et al.

(10) Patent No.: US 10,135,100 B2
(45) Date of Patent: Nov. 20, 2018

(54) METHOD FOR RECOVERING LEAD OXIDE FROM WASTE LEAD PASTE

(71) Applicant: BEIJING UNIVERSITY OF CHEMICAL TECHNOLOGY, Beijing (CN)

(72) Inventors: Junqing Pan, Beijing (CN); Yaru Bian, Beijing (CN); Yanzhi Sun, Beijing (CN); Yinjian Niu, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 0 days.

(21) Appl. No.: 15/505,608

(22) PCT Filed: Jun. 10, 2015

(86) PCT No.: PCT/CN2015/081203
§ 371 (c)(1),
(2) Date: Feb. 21, 2017

(87) PCT Pub. No.: WO2016/026344
PCT Pub. Date: Feb. 25, 2016

(65) Prior Publication Data
US 2017/0271725 A1   Sep. 21, 2017

(30) Foreign Application Priority Data
Aug. 20, 2014  (CN) .......................... 2014 1 0410675

(51) Int. Cl.
*H01M 10/00*      (2006.01)
*H01M 10/54*      (2006.01)
(Continued)

(52) U.S. Cl.
CPC ............ *H01M 10/54* (2013.01); *C01G 21/06* (2013.01); *C01G 21/14* (2013.01); *C22B 7/006* (2013.01);
(Continued)

(58) Field of Classification Search
CPC ....... H01M 10/06; H01M 10/54; C22B 7/006; C22B 13/045; C01G 21/02–21/10
(Continued)

(56) References Cited

U.S. PATENT DOCUMENTS

| 5,840,262 A | 11/1998 | Margulis |
| 5,944,869 A * | 8/1999 | Modica ................. C22B 13/045 429/49 |
| 8,147,780 B2 * | 4/2012 | Martini .................. C01G 21/02 422/224 |

FOREIGN PATENT DOCUMENTS

| CN | 101956214 A | 1/2011 |
| CN | 102367578 A | 3/2012 |

(Continued)

OTHER PUBLICATIONS

Abstract of CN 103773972A, dated May 7, 2014. (Year: 2014).*
(Continued)

*Primary Examiner* — Steven J Bos
(74) *Attorney, Agent, or Firm* — Hauptman Ham, LLP

(57) ABSTRACT

A method for recovering lead oxide from a pre-desalted lead paste, comprising the following steps: a. dissolving the pre-desalted lead plaster by using a complexing agent solution, and making all of PbO therein react with the complexing agent to generate lead complexing ions, obtaining a lead-containing solution and a filter residue; b. adding a precipitant to the lead-containing solution, and then the precipitant reacting with the lead complexing ions to generate a lead salt precipitate and the regenerated complexing
(Continued)

agent; c. calcining the lead salt precipitate to obtain lead oxide and regenerate the precipitant. The final recovery rate of lead oxide of the method can reach 99% or more.

7 Claims, 1 Drawing Sheet

(51) Int. Cl.
*C01G 21/06* (2006.01)
*C22B 7/00* (2006.01)
*C22B 3/00* (2006.01)
*H01M 10/06* (2006.01)
*C01G 21/14* (2006.01)
*H01M 4/56* (2006.01)

(52) U.S. Cl.
CPC .............. *C22B 13/045* (2013.01); *H01M 4/56* (2013.01); *H01M 10/06* (2013.01); *C01P 2006/80* (2013.01); *Y02P 10/234* (2015.11); *Y02W 30/84* (2015.05)

(58) Field of Classification Search
USPC ................................ 423/92–98, 619; 429/49
See application file for complete search history.

(56) References Cited

FOREIGN PATENT DOCUMENTS

| CN | 102618884 | A | 8/2012 |
| CN | 103014347 | A | 4/2013 |
| CN | 103146923 | A | 6/2013 |
| CN | 103374657 | A | 10/2013 |
| CN | 103509949 | A | 1/2014 |
| CN | 103526016 | A | 1/2014 |
| CN | 103771459 | A | 5/2014 |
| CN | 103773972 | A | 5/2014 |
| CN | 104141045 | A | 11/2014 |
| EP | 2333895 | A1 * | 6/2011 |
| WO | 2015/103845 | * | 7/2015 |

OTHER PUBLICATIONS

Abstract of PL 389639A1, dated Jun. 6, 2011. (Year: 2011).*
Abstract of CN 103184341A, dated Jul. 3, 2013. (Year: 2013).*
International Search Report issued in PCT/CN2015/081203 dated Nov. 25, 2015.

* cited by examiner

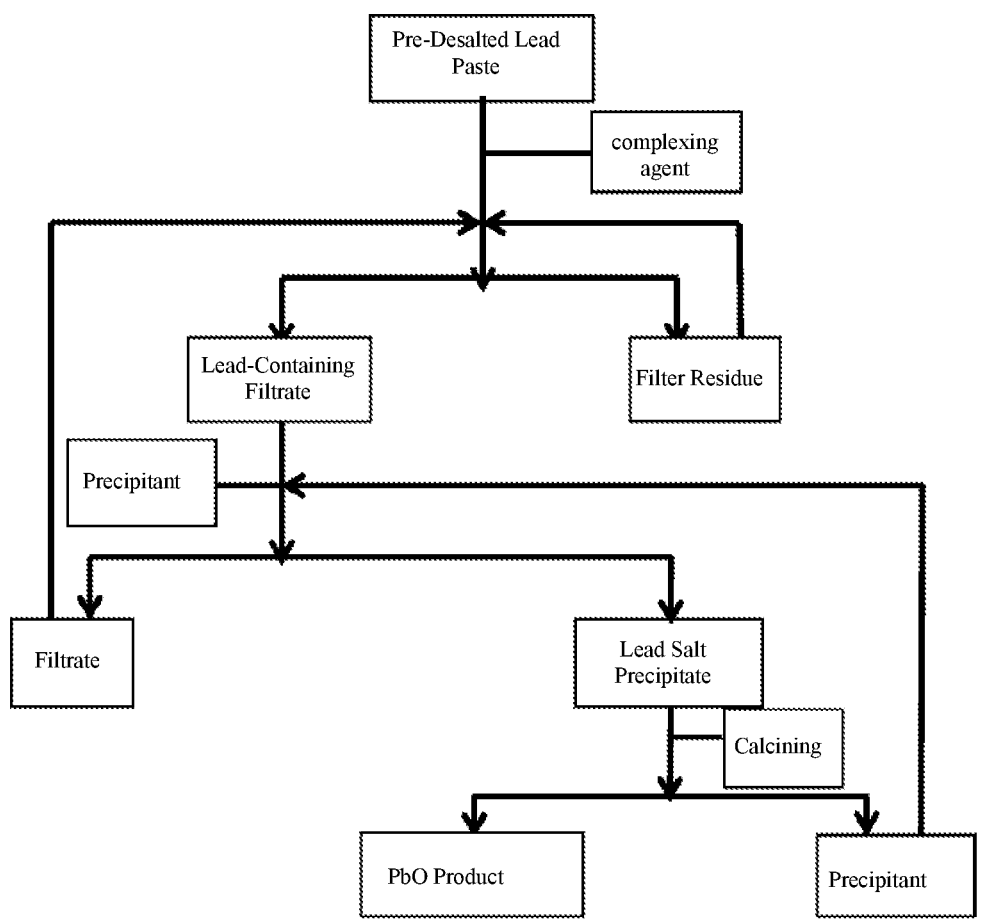

METHOD FOR RECOVERING LEAD OXIDE FROM WASTE LEAD PASTE

RELATED APPLICATIONS

The present application is a National Phase of International Application Number PCT/CN2015/081203, filed Jun. 10, 2015 and claims priority to Chinese Application Number 201410410675.3, filed Aug. 20, 2014.

FIELD OF THE INVENTION

The present invention belongs to the technical field of clean recovery of waste lead-acid batteries and lead regeneration.

BACKGROUND OF THE INVENTION

Lead-acid batteries have been widely applied in automobile, UPS, and mobile communication equipment fields, etc., owing to their advantages of low price, high safety, and reliable techniques, etc. Moreover, as the automobile consumption in China grows rapidly in recent years and the European Union promotes BlueMotion automobiles that employ an auto start/stop technique, it is foreseeable that the production of lead-acid batteries will still grow persistently in a long time in the future. Statistical results demonstrate that the yield of refined lead in China in 2012 was as high as 4.646 million tons, in which about 3.3 million tons of refined lead was used to manufacture lead-acid batteries. As primary lead ore resources become deficient gradually, waste lead-acid batteries have become the principal raw material in the regenerated lead industry increasingly. How to achieve clean recovery of waste lead-acid batteries is not only a demand for environmental safety, but also an urgent mission to be fulfilled for sustainable development of the regenerated lead industry.

At present, waste lead-acid batteries mainly contain waste lead plate gratings and lead paste, wherein, the lead paste accounts for about 60-65% of the lead used for lead-acid batteries. Compared with waste lead plate gratings, from which lead can be recovered simply by direct smelting, waste lead paste contains lead and lead compounds in a variety of forms, usually including Pb (8-13 wt. %), $PbSO_4$ (35-40 wt. %), PbO (8-15 wt. %) and $PbO_2$ (35-40 wt. %), and is the main challenge in the present lead recovery work. For a long time, the traditional pyrometallurgical recovery process has been used in the modern lead recovery industry. To decrease the smelting temperature and reduce emission of sulfur dioxide in the waste lead paste smelting process, sodium carbonate, ammonia or sodium hydroxide is usually utilized to remove lead salts (e.g., lead sulfate) in the lead paste in advance before the smelting procedure in the modern lead recovery process. Since lead sulfate is the principal lead salt in lead paste, the pre-desalting procedure of lead paste is usually referred to as a desulphurization procedure, i.e., utilizing an alkaline substance to remove the lead sulfate component in the lead paste. After desulphurization, the lead paste has to be reduced at a high temperature to obtain crude lead. Owing to the fact that the lead content in crude lead is usually 97-99%, crude lead has to be refined by electrolytic refining or pyro-refining to obtain refined lead at 99.99% purity, before it can be accepted by the downstream lead-acid battery manufacturers. Actually, refined lead cannot be used directly as an active substance in the manufacturing of lead-acid batteries; instead, refined lead has to be treated through three main procedures, i.e., melting, casting into lead balls, and ball milling and oxidation, to obtain lead oxide, which can be used as the principal raw material for producing lead paste. The lead recovery process involves a pyrometallurgical process at a temperature as high as 1,300° C., which not only consumes energy heavily, but also generates a large quantity of lead-containing waste residue and lead-containing dust in particle size smaller than PM2.5, resulting in severe secondary lead pollution is some regions. Likewise, the refining process of crude lead and the ball milling and oxidation process of refined lead also consume electric power heavily, and generate a large quantity of lead-containing dust. Apparently, the existing lead recovery process requires several links that consume energy heavily, including high temperature smelting, electrolytic refining, lead ingot melting, and ball milling and oxidation, etc., and is the main reason for heavy energy consumption and pollution of the present lead recovery industry, in which a pyrometallurgical process is employed. To meet the demand for lead oxide in the production of lead-acid batteries, it is desirable to invent a novel process for directly converting lead paste in waste lead-acid batteries or pre-desalted lead paste into high purity lead oxide required in the production of lead-acid battery, which will be a clean, energy-saving, and short-flow process.

Some research groups have made beneficial trials on conversion of waste lead paste into lead oxide. For example, as disclosed in the Chinese patent application No. CN201210121636.2, a raw material such as sodium carbonate is utilized to have a desulphurization reaction with waste lead paste, and the obtained desulfurized lead paste has a reaction with citric acid solution, and then the reaction product is dried to obtain lead citrate; finally, the lead citrate is calcined to prepare super-fine lead oxide. Though the target product in that invention is PbO, large quantities of chemical raw materials, including citric acid, hydrogen peroxide, and sodium carbonate, etc., are consumed. Therefore, that process is uneconomical from the viewpoint of atom utilization.

The concept of atom economy was put forth initially by Professor B. M. Trost in 1991 to improve the productivity of organic chemistry, in the hope that atom economy should be considered in organic synthesis reactions to convert the atoms in raw materials into target products as far as possible. Though the concept of atom economy was put forth against a phenomenon that there are many subsidiary reactions and the yield is low in organic chemical processes, actually a severe problem of atom economy also exists in traditional inorganic chemical processes in the modern times. For example, an existing wet process for recovering lead oxide from lead oxide ores mainly comprises the following 4 steps:

(1) first, dissolving PbO ores in nitric acid to obtain lead nitrate; in that step, other metal oxides are also dissolved in the nitric acid;

(2) adding sulfuric acid into the nitric acid dissolving solution, to obtain lead sulfate precipitate and waste nitric acid that contain other metals;

(3) filtering and separating, to obtain lead sulfate, and then adding sodium carbonate into the lead sulfate for desulphurization, to obtain lead carbonate and waste sodium sulfate solution;

(4) heating up the lead carbonate, so that the lead carbonate is decomposed to obtain a PbO product, and carbon dioxide waste gas is emitted.

The reaction equation and atomic quantities in the reaction process are expressed as follows:

$$PbO+2HNO_3=Pb(NO_3)_2+H_2O+10 \text{ atoms} \quad (1)$$

$$Pb(NO_3)_2+H_2SO_4=PbSO_4+2HNO_3+7 \text{ atoms} \quad (2)$$

$$PbSO_4+Na_2CO_3=PbCO_3+Na_2SO_4+6 \text{ atoms} \quad (3)$$

$$PbCO_3=PbO+CO_2 \quad (4)$$

In the above process that comprises 4 steps, the initial raw material PbO is composed of two atoms Pb and O, wherein, the reactant atoms added in the reactions expressed by the reaction equations (1), (2) and (3) are $2HNO_3$ (10 atoms), $H_2SO_4$ (7 atoms), and $Na_2CO_3$ (6 atoms) respectively; thus, the quantity of atoms participating in the entire process is 2+10+7+6=25, and the quantity of atoms in the target product is 2; hence, the atom utilization ratio in the entire process is 2/25=8%.

Apparently, the atom utilization ratio in the traditional lead oxide recovery process that seems reasonable is only 8%, which means that a large quantity of atoms from different raw materials is wasted in the production process. Consequently, that process not only consume raw materials heavily and brings a problem of high production cost, but also produces wastes, including waste nitric acid, waste sodium sulfate, and waste carbon dioxide, which may pollute the environment. Therefore, developing a novel atom-economic reaction or a process that has a high atom utilization ratio is the principal solution to clean recovery of waste lead materials.

A research group led by Professor Junqing Pan of Beijing University of Chemical Technology has done a lot of work related with lead-acid battery recovery. However, the research made by the research group in the early stage did not follow the principle of atom-economic reaction. For example, the authorized patent ZL201010297522.4 of the research group followed the traditional ideal in foreign countries, i.e., converting all other components (Pb, PbO and $PbO_2$) of lead paste into lead sulfate in sulfuric acid; consequently, the lead paste that contains 35-40% lead sulfate originally is turned into 100% lead sulfate though the sulfating reaction, resulting in consumption of a large quantity of sulfuric acid; moreover, additional 60-65% NaOH has to be consumed in the follow-up desulphurization stage to remove the newly added lead sulfate; as a result, not only the conversion cost is increased, but also a large quantity of atoms is wasted. A similar patent (Chinese Patent No. CN201310250004.0) has set forth a wet recovery method for lead-containing raw materials, wherein, the waste lead paste in lead-acid batteries is converted into lead sulfate and basic lead sulfate, but that method also has a problem of raw material consumption. Then, in a combined electrolytic lead recovery process (authorized patent ZL201110293590.8), the problem of atom economy was considered, and different desulphurization and stepwise electrolytic reduction measures were used for $PbSO_4$ and $PbO_2$, and thereby the problem of chemical raw material consumption in the preceding process was solved to a great extent; however, that process was still in the realm of the traditional metallic lead recovery ideal. In later work of the research group, such as the patent CN201210535154.1, new research was made to improve the utilization of atom economy in the conversion process, and the target product was direct a PbO product. In that work, NaOH was used to process lead paste to obtain sodium sulfate and $NaHPbO_2$ solution, then the solution was cooled to obtain crude PbO, and the crude PbO was dissolved again in NaOH solution for recrystallization, so that pure PbO was obtained. We have found a problem when we practicing the method disclosed in the patent: the Pb and $PbO_2$ reaction velocity in NaOH solution is low, and excessive $PbO_2$ and $NaHPbO_2$ may have subsidiary reaction to generate $Pb_3O_4$ that is stable in thermodynamics, as indicated below:

$$Pb+PbO_2+2NaOH=2NaHPbO_2$$

$$PbO_2+2NaHPbO_2=Pb_3O_4+2NaOH$$

To solve the above problem, the latest patent document CN201310084392.X has disclosed a method that directly utilizes a high-temperature solid-phase atom-economic reaction to obtain lead oxide from waste lead paste. In that work, waste lead paste and lead powder are heated up to have a solid phase reaction; then the mixture is desulfurized with a first sodium hydroxide solution to obtain crude PbO; next, the crude PbO is leached with a second sodium hydroxide solution to obtain lead-containing alkaline solution and filter residue; next, the lead-containing alkaline solution is purified and cooled to crystalize, so that PbO is obtained. Finally, the PbO is dissolved again in a third sodium hydroxide solution for recrystallization to obtain high-purity PbO crystals; then, NaOH is replenished to the first sodium hydroxide solution after desulphurization so that sodium sulfate crystals precipitate; thus, a NaOH desulphurization cycle is established, and a byproduct sodium sulfate is obtained. A characteristic of that method is: crude PbO is obtained through a solid phase reaction between Pb and $PbO_2$ in waste lead paste at a high temperature, the high temperature condition greatly improves the reaction velocity between Pb and $PbO_2$, and the residual $PbSO_4$ part is desulfurized with a first sodium hydroxide solution to obtain PbO; finally, the two PbO parts from different sources are dissolved together in NaOH solution, and purer solid PbO is obtained through a recrystallization process. In that method, only the desulphurization of the $PbSO_4$ part in waste lead paste consumes NaOH, while the atom-economic reaction between Pb and $PbO_2$ in lead paste and the reversible dissolution-crystallization process of PbO in NaOH are zero-consumption atom-economic processes theoretically. After research for almost one year, it is found that the method still has the following drawbacks at present:

1. Three NaOH solutions and two recrystallization processes are involved in the recovery process to obtain high-purity PbO;
2. In the initial solid phase conversion stage of waste lead paste at a high temperature, the $PbSO_4$, which accounts for 30-45 wt % of the lead paste, doesn't participate in the reaction before and after heating process; consequently, a lot of heat is consumed in vain, and the solid phase reaction between Pb and $PbO_2$ is not complete because a great deal of lead sulfate is included in the lead paste;
3. Owing to the fact that the lead paste contains a variety of impurities, such as Sn, Al and Sb, etc., which comes from the alloy of the plate grating, these amphoteric metals will be dissolved by the NaOH solution; consequently, the NaOH mother liquid is gradually contaminated by the impurities in the recrystallization process.

Therefore, it is a challenging and urgent task in the field of recovering waste lead-acid batteries currently to develop a novel process that can directly recover PbO from waste lead paste and has an atom-economic characteristic, in order to solve the problem that it is difficult to separate amphoteric metals with the current NaOH system and inertial $Pb_3O_4$ may be generated easily.

CONTENTS OF THE INVENTION

The object of the present invention is to provide an efficient, clean, and low-cost novel method for recovering PbO from lead paste in waste lead-acid batteries.

A first technical problem to be solved in the present invention is to reduce the procedure for dissolving or converting lead paste, which consume sulfuric acid or sulfate heavily, and reduce the procedure for desulphurization with a large quantity of alkaline liquor in the existing process as much as possible, so as to control the desulphurization to the lead sulfate part carried by the lead paste, and thereby save the raw material and improve atom economy as far as possible;

A second technical problem to be solved in the present invention is to provide a novel PbO purification process, in order to overcome the drawback of poor amphoteric metal impurity removing effect (Sn, Al, Sb, etc.) and a large number of recrystallization cycles in the crude PbO dissolution-recrystallization process in NaOH solution in the existing process;

A third technical problem to be solved in the present invention is to provide a novel reaction equation of Pb and $PbO_2$ to PbO and a novel catalyst, to overcome the drawback that the reaction velocity in the alkaline medium is low and $Pb_3O_4$ may be generated easily in the existing process.

To attain the object described above, the present invention provides a method for recovering PbO from pre-desalted lead paste, comprising the following steps:

a. dissolving pre-desalted lead paste by using a complexing agent solution, so that all PbO in the pre-desalted lead paste reacts with the complexing agent to generate lead complexing ions and thereby obtain a lead-containing solution and a filter residue;

b. adding a precipitant into the lead-containing solution, so that the precipitant reacts with the lead complexing ions to generate a lead salt precipitate and a regenerated complexing agent;

c. calcining the lead salt precipitate to obtain lead oxide, and regenerate the precipitant.

In the present invention, the lead paste obtained from waste lead-acid batteries has to be pre-desalted. A desalting or desulphurization process of lead paste is to use an alkaline solution to remove lead salt components ($PbSO_4$ and $PbCO_3$, etc.) in the lead paste, and is a known technique. Therefore, the "pre-desalted lead paste" described in the step a in the present invention refers to a product obtained through a reaction between lead paste and alkaline liquor, in which lead salts included in the lead paste are removed; the lead salts mainly contain lead sulfate ($PbSO_4$), but may also contain one or more of lead sulfite ($PbSO_3$), lead acetate ($Pb(CH_3COO)_2$), lead nitrate ($Pb(NO_3)_2$), lead perchlorate ($Pb(ClO_4)_2$), and lead carbonate ($PbCO_3$), wherein, the alkaline liquor may be a water solution of NaOH, KOH, ammonia, or $Ba(OH)_2$, etc., at 0.5-40 wt. % concentration, the lead salts included in the lead paste can directly react with the alkaline liquor by a desalting reaction to generate PbO and alkaline metal salts, alkaline earth metal salts, or ammonium salts. For example, in the case that the lead salt is $PbSO_4$, the alkaline liquor is NaOH water solution, the reaction equation is as follows:

$$PbSO_4 + 2NaOH = PbO + Na_2SO_4 + H_2O \quad (1)$$

After the total amount of $PbSO_4$ in the lead paste is ascertained through conventional chemical titrimetric analysis, the alkaline liquor is added for desalting. The alkaline liquor desalting treatment temperature is usually controlled at 10-95° C., the treatment time is usually 0.5-60 min., and the stirring speed is 50-600 rpm. After the lead paste is treated with the alkaline liquor, solid-liquid separation is carried out, to obtain pre-desalted lead paste and desalting mother liquid.

The pre-desalted lead paste mainly contains PbO (PbO that exists originally in the lead paste and PbO converted from the lead salts such as $PbSO_4$), Pb, and $PbO_2$; the impurity elements such as sulfate radicals and nitrate radicals in the lead salts enter into the desalting mother liquid; thus, they are separated from the lead paste. In the pre-desalting treatment, the traditional ideal of adding sulfuric acid to convert PbO into $PbSO_4$ is abandoned; instead, $PbSO_4$ is converted into PbO; thus, the use of a large quantity of sulfuric acid is avoided, and the process is more environment-friendly. Moreover, since the alkaline liquor used in the pre-desalting procedure has low concentration, the amphoteric metals (Sn, Al, Sb, etc.) can't be dissolved in the alkaline liquor; thus, a phenomenon that the desalting mother liquid is contaminated by those amphoteric metal impurities is avoided.

In the step a, the complexing agent is selected from compound with amino and carboxyl groups, organic amine, alcohol amine, or salts of them, wherein, the compound with amino and carboxyl groups is a compound of which the molecules contain both amino groups and carboxyl groups, and may be selected from α-amino acid, ethylene diammine diacetate, ethylenediamine tetraacetic acid, propanediamine diacetic acid, iminodiacetic acid, glucosaminic acid, or alginic acid; wherein, the organic amine is selected from methyl amine, ethylene diamine, propylene diamine, diethylene triamine, or triethylene tetramine; wherein, the alcohol amine is selected from ethanolamine, di-ethanolamine, or tri-ethanolamine. Furthermore, the α-amino acid is selected from aspartic acid, methionine, valine, lysine, isoleucine, phenylalanine, tryptophane, threonine, glycine, proline, histidine, glutamic acid, serine, arginine, sarcosine or citrulline.

Those complexing agents can have a complexing dissolution reaction with PbO through the following chemical equation (2), where, R represents complexing agent, and $[PbR]^{2+}$ represents lead complexing ions, the same below. The complexing dissolution phenomenon is known in the prior art, and will not be detailed here.

$$PbO + R + H_2O = [PbR]^{2+} + 2OH^- \quad (2)$$

Beyond expectation, the Pb and $PbO_2$ components in the lead paste have an oxidation-reduction reaction at the same time in existence of the complexing agent and generate PbO first, and then the newly generated active PbO has a complexing dissolution reaction with the complexing agent to generate lead complexing ions. Such PbO-selective complexing dissolution effectively avoids the problem of $Pb_3O_4$ precipitate in the existing conversion process in an alkaline solution. The reaction equation may be expressed as follows:

$$Pb + PbO_2 = 2PbO \quad (3)$$

$$PbO + R + H_2O = [PbR]^{2+} + 2OH^- \quad (4)$$

The overall reaction equation is:

$$Pb + PbO_2 + 2R + 2H_2O = 2[PbR]^{2+} + 4OH^-$$

That result is far beyond our expectation, because the reaction (3) usually happens only at a high temperature greater than 550° C. or under electrochemical conditions; in the former case, a lot of lead-containing dust is generated; in the latter case, a specific electrode is required to drive the electrochemical reaction to happen. However, in the present invention, the reaction in step a is executed in 5-110° C. water solution temperature range. The neutral complexing agent water solution not only avoids the problem of energy consumption and lead-containing dust incurred by the existing high-temperature conversion process, but also overcomes the problem of NaOH loss and equipment corrosion by strong NaOH solution incurred by absorpt carbon dioxide in the air into the NaOH alkaline solution in the existing process.

In the step a, the PbO comes from three sources: the original PbO in the pre-desalted lead paste, PbO generated in a reaction between the original Pb and $PbO_2$ from the pre-desalted lead paste in the complexing agent solution, and PbO obtained from oxidation of the original Pb in the pre-desalted lead paste or reduction of the original $PbO_2$ in the pre-desalted lead paste. In practice, the molar ratio of Pb to $PbO_2$ in lead paste may not be in stoichiometric balance rightly. Usually, before the waste lead-acid batteries are crashed, the Pb in the waste lead paste has had an oxidation reaction partially in the air; consequently, the Pb content in the lead paste obtained from the crashed lead-acid batteries is lower than the content of $PbO_2$. To ensure that the reaction can proceed completely, a small amount of reducer may be added, and the reducer preferably is metallic lead, such as a substance that contains metallic lead obtained from waste lead plate grating or electrode poles in waste lead-acid batteries, etc., so as to realize stoichiometric balance of the molar ratio of Pb to $PbO_2$. If the Pb content in the lead paste is greater than the content of $PbO_2$, it is unnecessary to add $PbO_2$ anymore; thus, the metallic lead is kept in an excessive state in the reaction, or the residual Pb is converted into PbO by blasting oxygen. An alternative option is: regardless of the Pb content and $PbO_2$ content in the pre-desalted lead paste, the pre-desalted lead paste is treated with adequate $H_2O_2$ solution to convert the Pb into PbO fully or reduce the $PbO_2$ to PbO fully. Owing to the fact that hydrogen peroxide has a peroxy bond in structure, it has oxidability for Pb but has reducibility for $PbO_2$. Therefore, excessive Pb can be oxidized into PbO or excessive $PbO_2$ can be reduced to PbO by adding $H_2O_2$. With the above-mentioned method, all the Pb element in the lead paste is fully converted into PbO, and then all PbO is complex-dissolved by the complexing agent into lead complexing ions; thus, the lead element is fully transformed from solid phase to liquid state.

In a preferred embodiment of the step a, in order to accelerate the oxidation-reduction reaction between Pb and $PbO_2$ and thereby accelerate the complexing dissolution of the materials, the inventor has found in the research process: the following substances can be added in small amounts as a catalyst for the above-mentioned reaction into the complexing agent solution, so as to greatly accelerate the redox reaction between Pb and $PbO_2$. The catalyst is mainly metal powder of copper(Cu), cobalt(Co), nickel(Ni) or silver(Ag), or a chloride, oxide or nitrate of the aforesaid metal, or a combination of them.

In the step a, owing to the fact that the complexing agent used in the present invention (e.g., a complexing agent with amino and carboxyl groups) has a natural pH buffer effect, the $OH^-$ generated in the PbO complexing dissolution reaction (4) can be buffered by its own carboxyl functional groups, so that the pH of the solution after the complexing dissolution does not change much. Owing to the differences between the carboxyl functional groups in amino carboxylic complexing agents, the pH of the PbO complexing solution is usually 5.2-10.3. On one hand, the amphoteric metal impurities (Sn, Al, Sb, etc.) in the lead paste cannot have a complexing dissolution reaction with the complexing agent; on the other hand, those impurities are not easily dissolved in the weak acid or weak base solution. Therefore, all of those amphoteric metal impurities can enter into the solid residue, and can be separated easily from the lead-containing solution (i.e., water solution of lead complexing ions) by a conventional solid-liquid separation means, such as filtering. Thus, the method avoids the problem that the amphoteric metal impurities (Sn, Al, Sb, etc.) are also dissolved and have an impact on the subsequent Pb recovery and purification process in the existing approach that utilizes NaOH to dissolve PbO.

In the step b, a precipitant is added into the lead-containing solution, so that the precipitant reacts with the lead complexing ions to generate a lead salt precipitate and a regenerated complexing agent, wherein, the precipitant is $CO_2$, $SO_2$ or $SO_3$ gas or a water solution of them, and the concentration of the precipitant water solution is controlled at 0.1-18 mol/L. The main reactions involved in the step b are shown as follows:

In the case that $CO_2$, $SO_2$ or $SO_3$ gas is added:

$$[PbR]^{2+}+SO_2+2OH^-=PbSO_3\downarrow+R+H_2O \qquad (5)$$

$$[PbR]^{2+}+SO_3+2OH^-=PbSO_4\downarrow+R+H_2O \qquad (6)$$

$$[PbR]^{2+}+CO_2+2OH^-=PbCO_3\downarrow+R+H_2O \qquad (7)$$

Or, in the case that $CO_2$, $SO_2$ or $SO_3$ water solution is added:

$$[PbR]^{2+}+H_2SO_3+2OH^-=PbSO_3\downarrow+2H_2O+R \qquad (8)$$

$$[PbR]^{2+}+H_2SO_4+2OH^-=PbSO_4\downarrow+2H_2O+R \qquad (9)$$

$$[PbR]^{2+}+H_2CO_3+2OH^-=PbCO_3\downarrow+2H_2O+R \qquad (10)$$

Thus, it is seen: after the precipitant is added, Pb always precipitates in the form of insoluble lead salts; at the same time, the complexing agent is regenerated.

Preferably, the regenerated complexing agent obtained in the step b is returned to the step a and reused.

In the step c, the lead salt precipitate obtained in the step b is desalted to obtain PbO. In the present invention, an optimal desalting method is calcined at a certain temperature; at the same time, PbO is obtained and the precipitant is released in that process. The reaction equations are as follows:

$$PbSO_3=PbO+SO_2\uparrow \qquad (11)$$

$$PbSO_4=PbO+SO_3\uparrow \qquad (12)$$

$$PbCO_3=PbO+CO_2\uparrow \qquad (13)$$

Wherein, the calcination temperature is 200-1450° C., preferably is 300-1200° C., more preferably is 300-800° C.; the calcination time is long enough to achieve complete decomposition.

Preferably, the regenerated precipitant obtained in the step c is returned to the step b and reused.

The present invention has the following advantages:
1. High atom economy feature: here, how the method in the present invention follows the atom economy principle is described in an example in which 1 mol Pb and $PbO_2$ are used as the raw material, and 2 mol $CO_2$ is used as the precipitant.

$$Pb+PbO_2+2R+2H_2O=2[PbR]^{2+}+4OH^- \qquad (4)$$

$$2[PbR]^{2+}+4OH^-+2CO_2=2PbCO_3+2H_2O+2R \qquad (7)$$

$$2PbCO_3=2PbO+2CO_2 \qquad (13)$$

The left sides and right sides of the equations (4), (7) and (13) are added respectively, and the same ions or molecules at the two sides of the overall equation are eliminated. Thus, it is seen: the two molecules of complexing agent R and two molecules of $H_2O$ consumed in the equation (4) are regenerated in the equation (7). Similarly, the two molecules of $CO_2$ consumed in the equation (7) are regenerated in the equation (13). Ultimately, the obtained overall reaction is as follows:

$$Pb + PbO_2 = 2PbO \tag{14}$$

If crude PbO with impurities is used directly as the raw material to execute the process represented by the equations (4), (7) and (13), finally a pure PbO product and an insoluble filter residue will be obtained. In the whole reaction process, all atoms enter into the product, and no atom is wasted and emitted. Hence, compared with the traditional chemical production process, the reaction is a typical atom-economic reaction.

2. The process is more environmental protection: compared with the reported lead regeneration process, in the present invention, PbO at purity as high as 99.97%-99.99% can be obtained directly through an atom-economic PbO recovery process. That process can meet the requirement of lead-acid batteries for high purity PbO, avoid procedures including, high temperature smelting, crude lead refining, lead ball casting, and ball milling oxidation, etc., in pyrogenic lead recovery, reduce energy consumption greatly, reduce secondary pollution incurred by lead dust and $SO_2$, and doesn't consume electric power heavily since electrolytic refining is not used. The process has a short process flow and a recovery rate as high as 99.2%, avoids waste of basic raw materials, and avoids the use of sulfuric acid and the discharge of waste acid in the production process. In addition, the catalyst and complexing agent used in the process are recycled and reused. Therefore, the method is an economic, efficient, environmental protection wet method for directly recover lead paste to produce PbO. Especially, if the complexing agent is a compound with ammonia and carboxyl groups, in particular an amino acid substance or glucosaminicacid substance, the environmental pollution resulted from the spent liquor can be greatly reduced, since such a substance is nontoxic and harmless.

3. Contamination by amphoteric metal impurities is avoided: the amphoteric metals (Sn, Al, Sb, etc.) can be dissolved only in concentrated sodium hydroxide. Since the alkaline liquor used in the desalting pre-treatment step a in the present invention has low concentration, the amphoteric metals (Sn, Al, Sb, etc.) cannot be dissolved. Thus, a phenomenon that the NaOH solution is contaminated by those amphoteric metal impurities is avoided. In addition, those amphoteric metals cannot be complex-dissolved by the complexing agent in the step a in the present invention; instead, they are separated as a filter residue from the lead-containing solution. Therefore, the method disclosed in the present invention has a good effect of removing impurity.

4. The processing conditions are milder: both the step a and the step b in the present invention can be executed at a water solution temperature; hence, the condition is milder. Especially, it is worthy to note: in the step a in the present invention, we have found a normalized reaction between Pb and $PbO_2$ unexpectedly, which can happen only at a high temperature or in a charge/discharge process conventionally; however, the reaction happens under a solution conditions in the present invention. Hence, the processing conditions in the present invention are very mild, and the final product PbO obtained with the method in the present invention has very high purity, up to 99.9% or higher.

5. The method has high raw material adaptability and realizes a more flexible technological process: in view of different contents of Pb, PbO and $PbO_2$ in lead paste materials from different industrial sources, lead powder can be added, oxygen can be charged, or hydrogen peroxide can be added, so that the Pb element is fully converted into PbO. Thus, the method disclosed in the present invention is not only highly adaptive to lead paste materials in different and complex compositions, but also makes the technological process more flexible. More importantly, the comprehensive recovery rate of Pb is greatly improved, up to 99% or higher.

DESCRIPTION OF THE DRAWINGS

FIG. 1 is a schematic process flow chart of PbO recovered from waste lead paste with the atom-economic method according to the present invention.

DETAILED DESCRIPTION OF THE EMBODIMENTS

Hereunder the present invention will be detailed in embodiments with reference to the accompanying drawings, to make the above-mentioned advantages of the present invention understood more clearly. The accompanying drawings are provided only to describe the present invention, but do not constitute any limitation to the present invention.

Embodiment 1

Lead paste obtained by crashing and separating waste commercial 12V, 7 Ah valve-regulated sealed lead-acid batteries with a conventional method is used. After the total amount of $PbSO_4$ in the lead paste is ascertained through conventional chemical titrimetric analysis, 10% NaOH is added at a stoichiometric ratio as alkaline liquor, the processing temperature is controlled at 35° C., the processing time is 10 min., and the stirring rate is 100 rpm. After the lead paste is treated with the alkaline liquor, solid-liquid separation is carried out, to obtain pre-desalted lead paste and desalting mother liquid that mainly contains $Na_2SO_4$. The treating process is as follows:

a. 1 kg pre-desalted lead paste is added into a first reactor (10 L), 0.6 kg lead powder obtained by crashing lead-containing plate grating with a conventional method is added in an excessive amount into the reactor, 8 g CoO is added as a catalyst, 0.5 mol/L arginine water solution is added in an adequate amount as a complexing agent, and the mixture is stirred for 1.5 h at 60° C. constant temperature. The mixture obtained through the reaction is filtered and separated, to obtain lead-containing solution and filter residue. The lead-containing solution is laid aside to treat in the follow-up step b. Through analysis, it is found that the filter residue is essentially a solid mixture that contains some residual lead powder and impurities, wherein, the lead powder can be returned to the step a and reused, or can be separated with a conventional gravity separation method to obtain lead powder.

b. The lead-containing solution obtained in the step a is transferred into a second reactor (25 L), $CO_2$ is charged in an adequate amount continuously while stirring at 50° C.

constant temperature, till no precipitate is generated anymore. The mixture after the reaction is filtered and separated, to obtain PbCO$_3$ precipitate and filtrate that contains regenerated arginine, wherein, the filtrate is returned to the step a and reused.

c. The obtained PbCO$_3$ precipitate is transferred into a calcinator, and is calcined for 2 h at 390° C., to obtain PbO product and CO$_2$, wherein, the CO$_2$ is returned to the step b and reused.

Through calculation, it is ascertained that 1.48 kg PbO product is obtained finally through the above-mentioned overall circulation process, the purity of the PbO product is 99.98%, and the comprehensive recovery rate of Pb is 99.4%.

Embodiment 2

12% KOH solution is used as the pre-desalting alkaline liquor, and the desalting temperature is 40° C. In the step a, 0.75 mol/L ethylene diamine water solution is used as the complexing agent, and 13 g CuO is used as the catalyst; in the step b, SO$_2$ is used in replacement of CO$_2$. The rest conditions are the same as those in the embodiment 1. The purity of the PbO obtained finally is 99.97%, and the comprehensive recovery rate of Pb is 99.6%.

Embodiment 3

In the step a, 1 mol/L ethylene diammine diacetate water solution is used as the complexing agent, and 5 g silver nitrate is used as the catalyst; in the step b, SO$_3$ is used in replacement of CO$_2$. The rest conditions are the same as those in the embodiment 1. The purity of the PbO obtained finally is 99.96%, and the comprehensive recovery rate of Pb is 99.5%.

Embodiment 4

In the step a, 0.5 mol/L ethanolamine, di-ethanolamine, tri-ethanolamine, ethylenediamine tetraacetic acid, propanediamine diacetic acid or a sodium salt of it, iminodiacetic acid or a sodium salt of it, and alginic acid or a sodium salt water solution of it are used as the complexing agent in turns; independently, Ni or Ag metal powder, or a chloride of the metal powder is used as the catalyst in the step a. The rest conditions are the same as those in the embodiment 1. The purity of PbO obtained finally is always 99.96% or higher, and the comprehensive recovery rate of Pb is always not lower than 99.5%.

Embodiment 5

Lead paste obtained by crashing and separating waste commercial 12V, 100 Ah valve-regulated sealed lead-acid batteries with a conventional method and desalted with alkaline liquor is used. The treating process is as follows:

a. 1 kg desalted lead paste is added into a first reactor (10 L), lead powder is added in an excessive amount into the reactor, 40-50 g nickel chloride and 1 mol/L lysine solution are added, and the mixture is stirred for 1 h at 50° C. constant temperature. The mixture obtained through the reaction is filtered and separated, to obtain lead-containing solution and filter residue.

b. The lead-containing solution obtained in the step a is transferred into a second reactor (10 L), SO$_2$ gas is charged in an adequate amount continuously while stirring at 50° C. constant temperature, till no precipitate is generated anymore. The solution is filtered, to obtain PbSO$_3$ precipitate and filtrate that contains regenerated lysine, wherein, the filtrate is returned to the step a and reused.

c. The obtained PbSO$_3$ precipitate is transferred into a calcinator, and is calcined for 1 h at 350° C., to obtain PbO product and SO$_2$, wherein, the SO$_2$ is returned to the step b and reused.

Through calculation, it is ascertained that 1.49 kg PbO product is obtained finally through the above-mentioned overall process, the purity of the PbO product is 99.97%, and the comprehensive recovery rate of Pb is 99.3%.

Embodiment 6

Lead paste obtained by crashing and separating waste commercial 12V, 55 Ah valve-regulated sealed lead-acid batteries with a conventional method and desalted with alkaline liquor is used. The treating process is as follows:

a. 1 kg desalted lead paste is added into a first reactor (10 L), lead powder obtained by crashing lead-containing plate grating with a conventional method is added in an excessive amount into the reactor, and then 13 g CuO and 2.5 mol/L propylene diacetic acid −0.3 mol/L histidine solution are added, and the mixture is stirred for 50 min. at 50° C. constant temperature. The mixture obtained through the reaction is filtered and separated, to obtain lead-containing solution and filter residue.

b. The lead-containing solution obtained in the step a is transferred into a second reactor (10 L), CO$_2$ gas is charged while stirring at 50° C. constant temperature, till no precipitate is generated anymore. The solution is filtered, to obtain PbCO$_3$ precipitate and filtrate that contains regenerated propylene diacetic acid and regenerated histidine, wherein, the filtrate is returned to the step a and reused.

c. The obtained PbCO$_3$ precipitate is transferred into a calcinator, and is calcined for 1 h at 400° C., to obtain PbO product and CO$_2$, wherein, the CO$_2$ is returned to the step b and reused.

Through calculation, it is ascertained that 1.48 kg PbO product is obtained finally through the above-mentioned overall process, the purity of the PbO product is 99.98%, and the comprehensive recovery rate of Pb is 99.93%.

Embodiment 7

Lead paste obtained by crashing and separating waste commercial 12V, 12 Ah valve-regulated sealed lead-acid batteries with a conventional method is used. 1 kg lead paste is taken and desalted with the same alkaline liquor as that used in the embodiment 1, to obtain pre-desalted lead paste. Then, the following treating process is executed:

a. The pre-desalted lead paste is added into a first reactor (30 L), lead powder obtained by crashing lead-containing plate grating with a conventional method is added in an excessive amount into the reactor, and then 5 g silver nitrate and 2.0 mol/L glucosaminicacid solution are added, and the mixture is stirred for 120 min. at 65° C. constant temperature. The mixture obtained through the reaction is filtered, to obtain lead-containing solution and filter residue.

b. The lead-containing solution obtained in the step a is transferred into a second reactor (25 L), 6 mol/L dilute sulfuric acid is added in an stoichiometric amount while stirring at 65° C. constant temperature, till no precipitate is generated anymore. The solution is filtered, to obtain PbSO$_4$ precipitate and filtrate that contains regenerated glucosaminicacid, wherein, the filtrate is returned to the step a and reused.

c. The obtained PbSO$_4$ precipitate is transferred into a calcinator, and is calcined for 1 h at 350° C., to obtain PbO product and SO$_3$ gas, wherein, the SO$_3$ gas is dissolved in water to obtain dilute sulfuric acid, which is then returned to the step b and reused.

Through calculation, it is ascertained that 1.49 kg PbO product is obtained finally through the above-mentioned overall process, the purity of the PbO product is 99.99%, and the comprehensive recovery rate of Pb is 99.94%.

Embodiment 8

Anode lead paste obtained by crashing and separating waste commercial 12V, 14 Ah valve-regulated sealed lead-acid batteries with a conventional method is used. 1 kg lead paste is taken and desalted with the same alkaline liquor as that used in the embodiment 1, to obtain pre-desalted lead paste. Then, the following treating process is executed:

a. 1 kg desalted lead paste is added into a first reactor (30 L), 100 ml 10 wt % H$_2$O$_2$ solution is added into the reactor first, and then 350 g lead powder, 5 g copper sulfate and 2.2 mol/L glucosaminicacid solution are added, and the mixture is stirred for 120 min. at 70° C. constant temperature. The mixture obtained through the reaction is filtered, to obtain lead-containing solution and filter residue.

b. The lead-containing solution obtained in the step a is transferred into a second reactor (25 L), CO$_2$ gas is charged in an adequate amount while stirring at 65° C. constant temperature, till no precipitate is generated anymore. The solution is filtered, to obtain PbCO$_3$ precipitate and filtrate that contains regenerated glucosaminicacid, wherein, the filtrate is returned to the step a and reused.

c. The obtained PbCO$_3$ precipitate is transferred into a calcinator, and is calcined for 1 h at 440° C. under a reduced pressure, to obtain PbO product and CO$_2$ gas, wherein, the CO$_2$ gas is returned to the step b and reused.

Through calculation, it is ascertained that 1.59 kg PbO product is obtained finally through the above-mentioned overall process, the purity of the PbO product is 99.99%, and the comprehensive recovery rate of Pb is 99.95%.

While the present invention is described above exemplarily in some preferred embodiments, apparently the present invention is not limited to the above-mentioned embodiments. Various equivalent modifications can be made to the technical scheme of the present invention within the scope of the technical concept of the present invention, and those equivalent modifications belong to the protection scope of the present invention. For example, though some complexing agents are described exemplarily with several ammonia carboxylic compounds, the object of the present invention can be attained with other ammonia carboxylic compounds equivalent to those ammonia carboxylic compounds, such as amino acid substances. Such examples are not described here exhaustively, to avoid unnecessary repetition.

In addition, it should be noted that the technical features described in the above embodiments can be combined separately, as long as they are within the scope of the technical ideal of the present invention.

The invention claimed is:

1. A method for recovering lead oxide from pre-desalted lead paste, comprising the following steps:

a. dissolving pre-desalted lead paste with a complexing agent solution, so that all PbO in the pre-desalted lead paste reacts with the complexing agent to generate lead complexing ions and thereby obtain a lead-containing solution and a filter residue, wherein the PbO originates from the PbO in the pre-desalted lead paste and PbO generated in a reaction between the Pb and PbO$_2$ from the pre-desalted lead paste in the complexing agent solution and further includes PbO obtained from oxidation of the Pb in the pre-desalted lead paste or from reduction of the PbO$_2$ in the pre-desalted lead paste, and wherein the complexing agent is a compound having amino and carboxyl groups, an organic amine, an alcohol amine or salts thereof;

b. adding a precipitant into the lead-containing solution, so that the precipitant reacts with the lead complexing ions to generate a lead salt precipitate and a regenerated complexing agent, wherein the precipitant is gaseous CO$_2$, SO$_2$, SO$_3$ or a water solution thereof;

c. calcining the lead salt precipitate to obtain lead oxide and regenerate the precipitant.

2. The method according to claim 1, wherein, the pre-desalted lead paste is a product obtained by reaction between the lead paste and an alkaline liquor in which the lead salts included in the lead paste are removed, wherein the lead salt is PbSO$_4$, PbSO$_3$, Pb(CH$_3$COO)$_2$, Pb(NO$_3$)$_2$, Pb(ClO$_4$)$_2$ or PbCO$_3$, the alkaline liquor is a water solution of NaOH, KOH, ammonia, or Ba(OH)$_2$ in which the concentration in weight percentage is 0.5-40%, and the desalting time is 0.5-60 min.

3. The method according to claim 1, wherein, the compound having amino and carboxyl groups is α-amino acid, ethylene diammine diacetate, ethylenediamine tetraacetic acid, propanediamine diacetic acid, iminodiacetic acid, glucosaminic acid, or alginic acid; and wherein the organic amine is methyl amine, ethylene diamine, propylene diamine, diethylene triamine, or triethylene tetramine; and wherein the alcohol amine is ethanolamine, di-ethanolamine, or tri-ethanolamine.

4. The method according to claim 1, wherein, in the step a, a catalyst is added into the complexing agent solution to accelerate the oxidation-reduction reaction between Pb and PbO$_2$ that generates PbO, wherein, the catalyst is metal powder of Cu, Co, Ni, or Ag, or chlorides, oxides or nitrates of the metal.

5. The method according to claim 1, wherein, additional lead is added in the step a, so as to fully reduce PbO$_2$ to PbO; or oxygen is injected into the complexing agent solution in the step a, so as to fully convert Pb into PbO; or the pre-desalted lead paste is treated with H$_2$O$_2$ solution, so as to fully oxidize Pb to PbO, or fully reduce PbO$_2$ to PbO.

6. The method according to claim 1, wherein, the regenerated complexing agent obtained in the step b is returned to the step a and reused; and/or the regenerated precipitant obtained in the step c is returned to the step b and reused; wherein, both the step a and the step b are performed within a water solution temperature range of 5-110° C.

7. The method according to claim 3, wherein, the α-amino acid is aspartic acid, methionine, valine, lysine, isoleucine, phenylalanine, tryptophane, threonine, glycine, proline, histidine, glutamic acid, serine, arginine, sarcosine or citrulline.

* * * * *